(12) United States Patent
Tijssen et al.

(10) Patent No.: US 9,047,641 B2
(45) Date of Patent: Jun. 2, 2015

(54) METHODS AND SYSTEMS FOR USING METADATA TO REPRESENT SOCIAL CONTEXT INFORMATION

(75) Inventors: Remon Tijssen, Mill Valley, CA (US); Julie Spiegler, Montara, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1028 days.

(21) Appl. No.: 12/271,869

(22) Filed: Nov. 15, 2008

(65) Prior Publication Data

US 2014/0032772 A1  Jan. 30, 2014

(51) Int. Cl.
*G06F 15/16* (2006.01)
*G06Q 50/00* (2012.01)
*G06Q 10/10* (2012.01)
*H04L 12/18* (2006.01)
*H04L 29/06* (2006.01)

(52) U.S. Cl.
CPC ............ *G06Q 50/01* (2013.01); *H04L 12/1831* (2013.01); *H04L 12/1813* (2013.01); *H04L 65/403* (2013.01); *G06Q 10/101* (2013.01)

(58) Field of Classification Search
CPC ............ H04L 12/1831; H04L 12/1813; H04L 65/403
See application file for complete search history.

(56) References Cited

U.S. PATENT DOCUMENTS

| | | | |
|---|---|---|---|
| 2004/0001631 A1* | 1/2004 | Camara et al. ................. | 382/224 |
| 2005/0021624 A1* | 1/2005 | Herf et al. ...................... | 709/204 |
| 2005/0138139 A1* | 6/2005 | Jain et al. ....................... | 709/225 |
| 2005/0198075 A1* | 9/2005 | Plastina et al. ............. | 707/104.1 |
| 2008/0049922 A1* | 2/2008 | Karniely .................. | 379/205.01 |
| 2009/0006091 A1* | 1/2009 | Lindroos et al. .............. | 704/243 |
| 2010/0007738 A1* | 1/2010 | Lehnert ......................... | 348/159 |

* cited by examiner

*Primary Examiner* — Hieu Hoang
*Assistant Examiner* — Nam Tran
(74) *Attorney, Agent, or Firm* — Shook, Hardy & Bacon LLP

(57) ABSTRACT

A method includes establishing an interaction session between a plurality of devices associated with a plurality of users, respectively. Access to an asset by a first device in the interaction session is detected. Session metadata relating to the interaction session is associated with the asset. The asset may be an asset that was generated by another device during another interaction session or it may have been generated by the first device in the interaction session.

19 Claims, 15 Drawing Sheets

METHODS AND SYSTEMS FOR USING METADATA TO REPRESENT SOCIAL CONTEXT INFORMATION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, ADOBE SYSTEMS INCORPORATED. All Rights Reserved.

TECHNICAL FIELD

The present application relates generally to the technical field of data processing. An example embodiment relates to implementing metadata to represent context information.

BACKGROUND

Metadata has generally been used to associate static information for the purpose of forming data structures used in application developments. The static information and the structure of the metadata is one dimensional and flat. An example of a metadata may be a title of a book, a color of an object, etc.

BRIEF DESCRIPTION OF DRAWINGS

Some embodiments are illustrated by way of example and not limitation in the figures of the accompanying drawings in which.

DETAILED DESCRIPTION

For some example embodiments, methods and systems to enable using metadata to describe social contexts are disclosed. In the following description, for purposes of explanation, numerous specific details are set forth in order to provide a thorough understanding of some example embodiments. It will be evident, however, to one skilled in the art that the present invention may be practiced without these specific details.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Network Architecture

Figure 1:
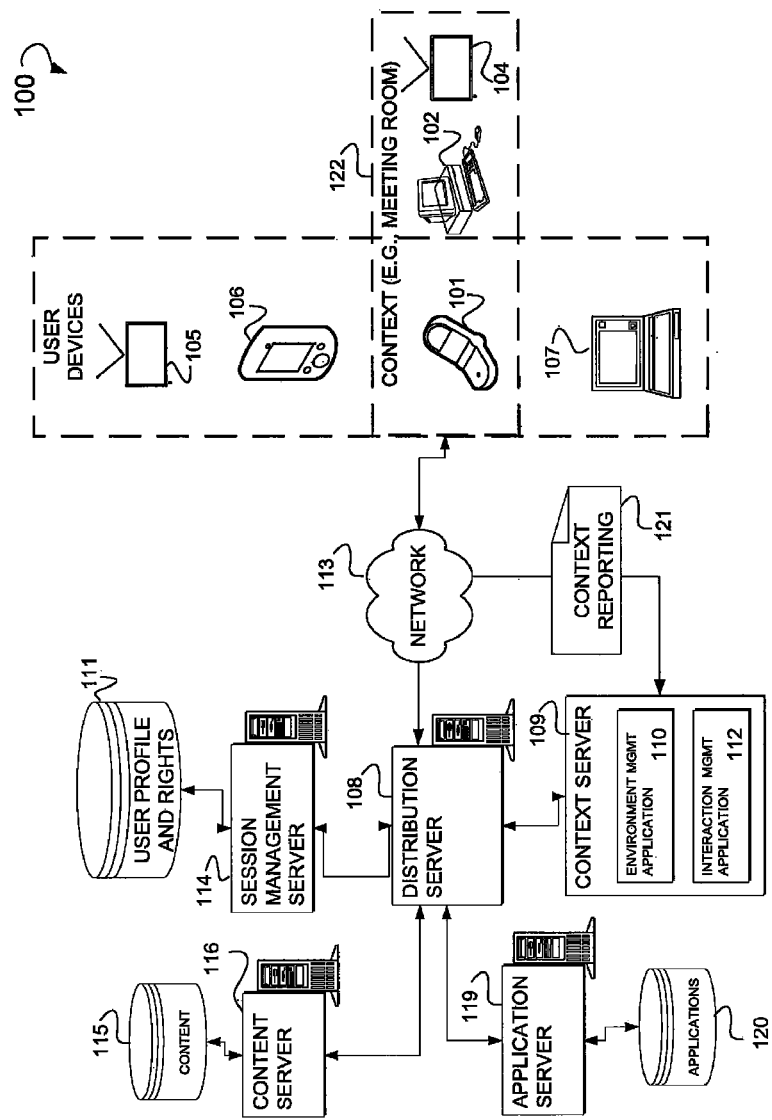
FIG. 1 is a diagram illustrating an example network including network devices and devices, in accordance with some example embodiments.

FIG. 1 is an example network diagram illustrating network devices and devices, in accordance with some example embodiments. Diagram 100 is illustrated to include various devices and network devices coupled to network 113. In this example, various types of devices may be used. These devices may include, for example, a television 105, Personal Digital Assistant (PDA) 106, cell phone 101, and laptop computer (e.g., "laptop") 107. One or more of these devices may participate in a context 122 with other devices. These other devices may include, for example, a computer 102 and a television 104. The context 122 may be defined to include information about the participating devices (e.g., features, asset, position, etc.), interactions (e.g., sharing asset, etc.) among the devices, and users or operators of the devices. Within the context 122, the cell phone 101, the computer 102, and television 104 may share an asset. Examples of an asset may include a photograph or an application such as a software product.

For some example embodiments, one or more of the devices 101, 102, 104 participating in the context 122 may engage in context reporting. A context report 121 may be generated. The context report 121 includes information relating to the devices and the users participating in a context. The context report 121 may be formatted using an eXtensible Markup Language (XML). The context report 121 may be transmitted from a device to network 113 and received by, for example, distribution server 108. The distribution server 108 may store the context report 121 and may share the context report 121 with other devices. The network 113 may be an Internet, a Local Area Network (LAN), a Wide Area Network (WAN), a combination of the Internet, LAN and/or WAN, or some other suitable type of network as associated topology.

For some example embodiments, the distribution server 108 may be connected to a session management server 114, a context server 109, a content server 116, and an application server 119. These various servers (e.g., 108, 114, 109, and 116) may participate in a cloud computing paradigm. Additionally, these various servers may be implemented on a single computer system, or multiple computer systems. The distribution server 108 may be configured to receive information from the devices 101, 102, 104 and to route the information to one or more of the servers 109, 114, 116 and 119. In addition, the distribution server 108 may be configured to distribute information received from one or more of the servers 109, 114, 116 and 119 to one or more of the devices 101, 102, 104.

The context server 109 may include an environment management module 110 and an interaction management module 112. The interaction management module 112 tracks the interactions among the devices 101, 102, 104 in the context 122. Example interactions include the sharing of assets. The environment management module 110 tracks the environment within which the interaction occurs. The environment includes information relating to the interaction such as the physical location of the devices participating in the context 122, the time and date of participation by the devices 101, 102, 104 within the context 122, the amount and type of assets shared and other suitable information.

The session management server 114 may be used to establish and manage one or more sessions. A session is uniquely identified via a unique numeric identifier (also referred to as a session ID). A session may include one or more devices and may enable the devices to communicate with one another. Each device may be associated with a unique device identifier (also referred to as a device ID). Each user or operator of a device may be associated with a user identifier (also referred to as a user ID). A combination of a session ID with a user ID and/or a device ID may be used to identify participants of a session. The term participant may refer to a combination of either one or both of the user ID and device ID.

The session management server 114 may be associated with a user profile and rights data base 111 which may be used to store the session ID, the user ID, and/or the device ID. The right may include legal rights associated with an asset and its use. The user profile may include personal information about the users of the devices along with their corresponding user IDs.

The content server 116 may be configured to keep track of contents that may be distributed to the devices 101, 102, 104. The contents may include images, video, audio-video, and text-based content. The content is stored in the content data base 115 connected to the content server 116. The application server 119 may be configured to keep track of applications that are distributed to the devices 101, 102, 104. The applications may include executable modules, software components, software applications, etc. These applications are stored in the application database 120. These applications may be used to enhance, augment, supplement, or facilitate the functionality of one or more of the devices 101, 102, 104.

Context and Session Establishment

Figure 2:
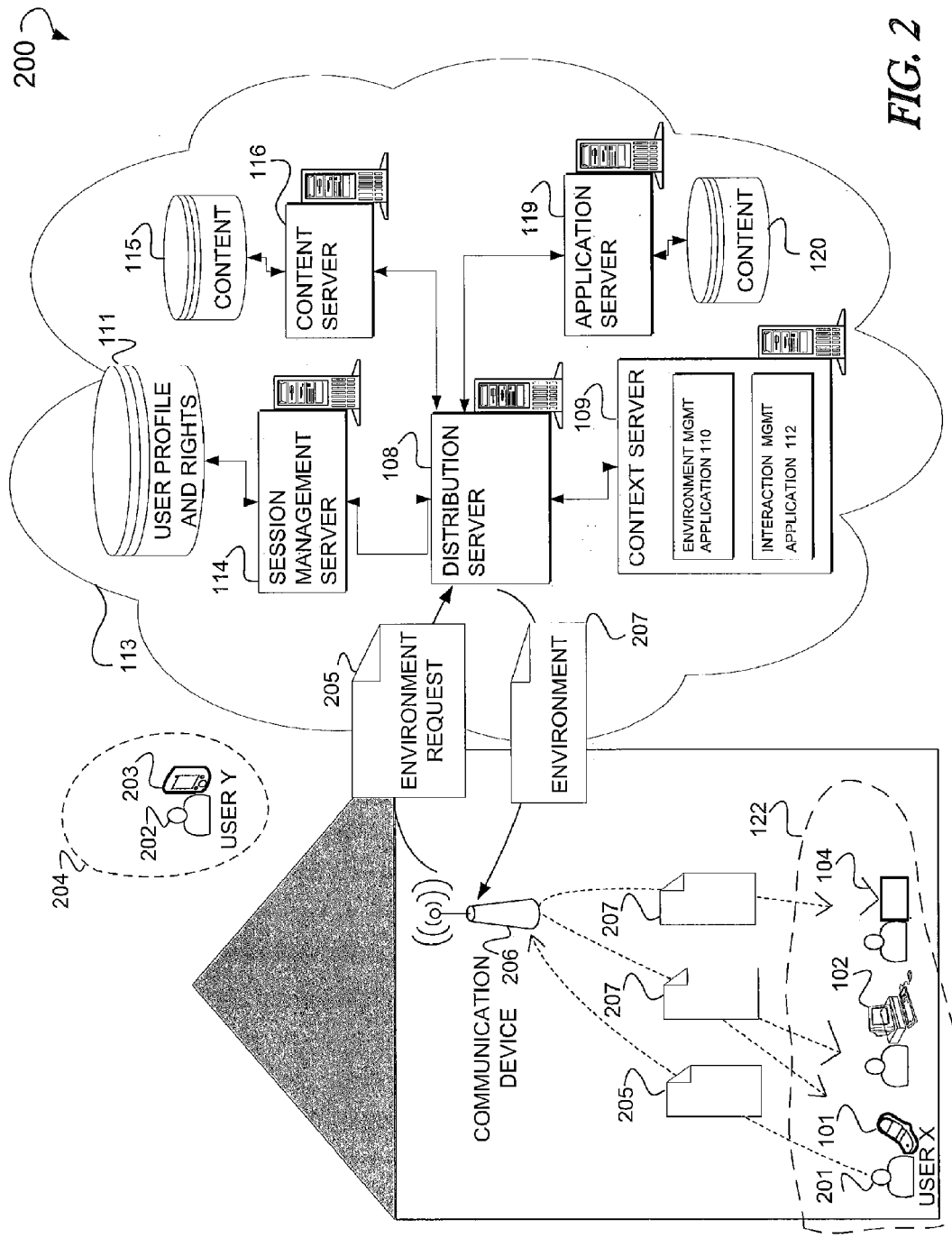
FIG. 2 is a diagram illustrating connection examples of the devices in a network, in accordance with some example embodiments.

FIG. 2 is an example diagram illustrating establishment of sessions in a network, in accordance with some example embodiments. In this example, a user 201, referenced as "user x," is associated with the cell phone 101. The user 201 may also be associated with other devices. Further, shown is the computer 102 and television 104. As previously illustrated in FIG. 1, the cell phone 101, the computer 102, and the television 104 all participate in the context 122. The context 122 may be in the form of a physical structure (e.g., a meeting room, a living room, a coffee shop, etc.). For some example embodiments, each of the devices 101, 102 and 104 may be equipped with a communication interface (e.g., a wireless interface) to enable the device to establish a wireless connection with a wireless router device such as, for example, the communication device 206.

For some example embodiments, the user 201 generates an environment request 205 that is received by the communication device 206 and transmitted across the network 113. The environment request 205 may request for environment information relating to the relative physical location of the devices in a particular context. The environment information may have been previously generated and stored by the environment management module 110 of the context server 109.

The distribution server 108 may receive the environment information 207 from the context server 109 and transmit the environment information 207 to the communication device 206 and to at least the device (e.g., the cell phone 101, computer 102, or television 104) that initiated the environment request 205. Additionally, illustrated is a user 202, referenced as a "user y." The user 202 may be associated with context 204 in which the PDA 203 participates. For some example embodiments, the context 204 and context 122 may be combined together to form a single context. This combination of the two contexts 122 and 204 may occur where the PDA 203 joins the context 122. Joining may occur, for example, based on the PDA 203 being relocated to a location within the context 122.

Device Architecture

Figure 3A:
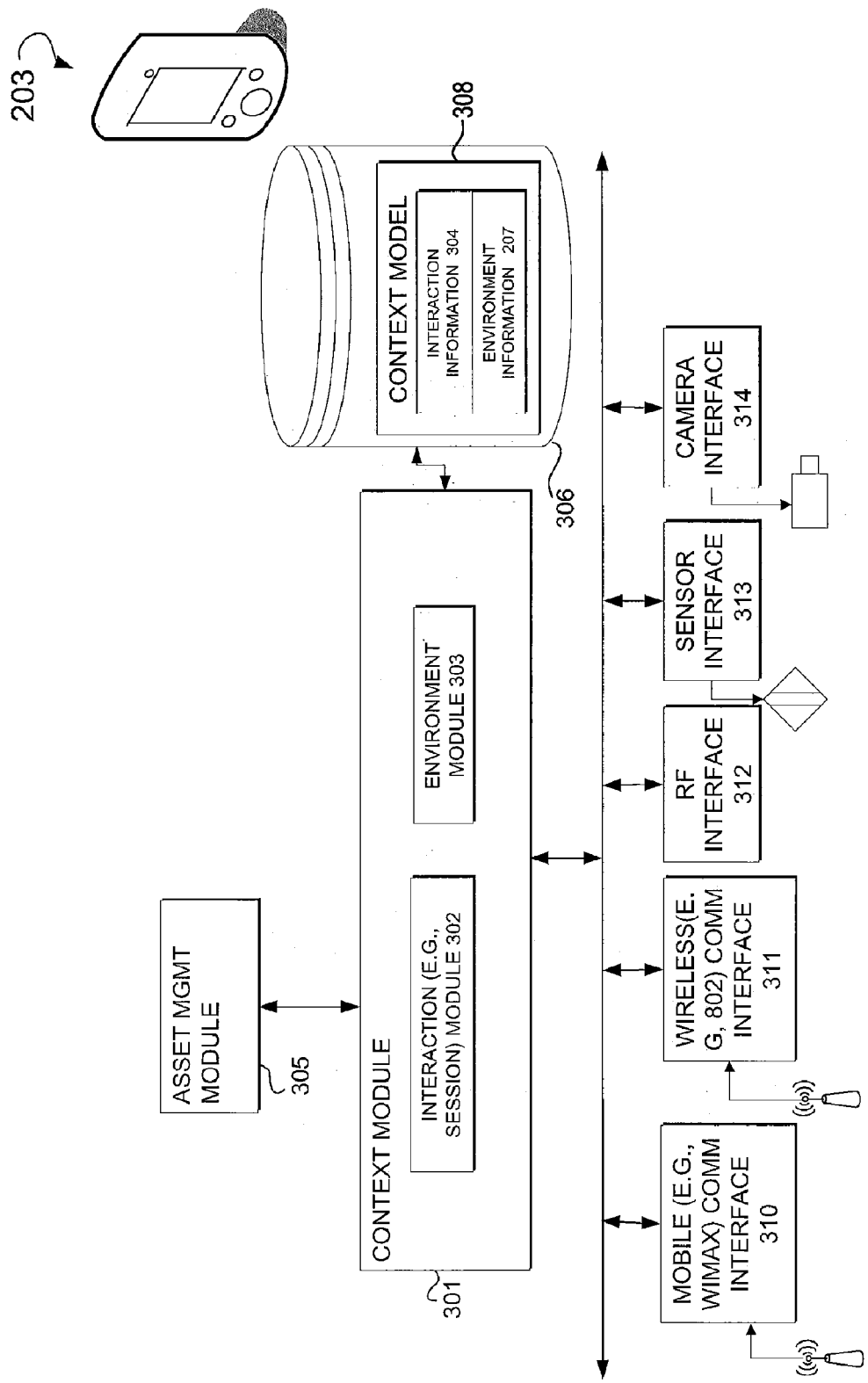
FIG. 3A is a diagram illustrating example architecture of a device, in accordance with some example embodiments.

FIG. 3A is an example diagram illustrating architecture of a device, in accordance with some example embodiments. Illustrated is an example PDA 203 that includes functionality that enables the PDA 203 to interact with other devices. The interactions may occur in an environment or a session. The various blocks illustrated in FIG. 3A may be implemented using hardware, firmware, or software. Context module 301 includes an interaction module 302 and an environment module 303. This interaction module 302 may be used to establish a session in which the device 203 may participate. Additionally, the context module 301 may include an environment module 303 that is used to generate the environment request 205, and to process the environment information 207.

Connected to the context module 301 is an asset management module 305. The asset management module 305 may be used to process assets including content and applications. Processing includes, for example, display, play, record, and execute. Example applications include FLASH™ of Adobe Systems Incorporated, ACROBAT™ of Adobe Systems Incorporated, PHOTOSHOP™ of Adobe Systems Incorporated, or some other suitable application. The context module 301 may be connected to a database 306 which may store environment information 207. The database 306 may also store interaction information 304. Included as part of the interaction information 304 may be session information including a session ID along with user ID and/or device ID. The environment information 207 and the interaction information 304 may be parts of a context model 308. The PDA 203 may include various types of communication interfaces 310-314 to facilitate establishing a session, to communicate with other devices, to receive and to generate content, etc.

A combination of at least the context module 301 and the asset management module 305 in a device such as the PDA 203 (as described in FIG. 3A) may be referred to collectively as agent software. The agent software enables a device to communicate with the distribution server 108 and the other servers connected to the distribution server 108 in the network 113. The server and database resources connected to the network 113 (as described in FIGS. 1-2) may be referred to collectively as network services. For some example embodiments, a user may be associated with one or more devices, with each device having a unique device ID. Each user may be associated with a unique user ID.

Figure 3B:
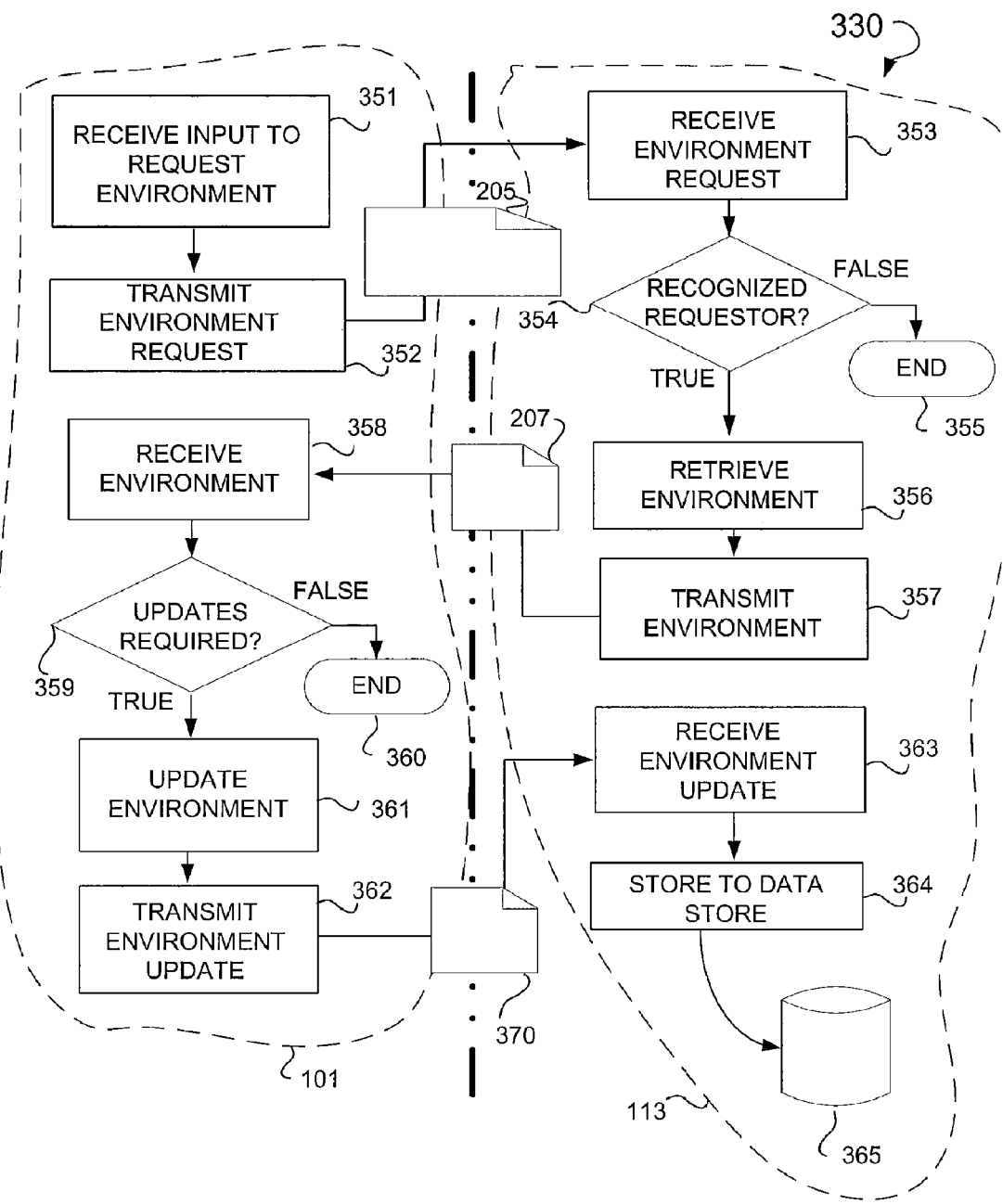
FIG. 3B is a flow diagram illustrating an example method of accessing environment information using a device, in accordance with some example embodiments.

FIG. 3B is a flow diagram illustrating an example method 330 of accessing environment information using a device, in accordance with some example embodiments. The flow diagram may be used to request and receive an environment and to generate an environment update. Shown are operations 351 through 352, and 358 through 362. These various operations may be executed by the cell phone 101, or other suitable device that interacts in a context. Also shown are operations 353 through 357, and 363 through 364. These various operations are executed with the network 113 and the various servers (e.g., 108, 114, 109, and 116) illustrated therein. For example, the distribution server 108 may execute these various operations 353 through 357, and 363 through 364. Shown is an operation 351 that, when executed, receives input to request an environment. This input may be generated by an input device such as a touch screen, mouse, keyboard, light pen, or other suitable input device. Operation 352 is executed to transmit the environment request 205. Operation 353, when executed, receives the environment request. Decisional operation 354 is executed to determine whether the device, and user associated therewith, is recognized as being able to request an environment. Where decisional operation 354 evaluates to "false," a termination condition 355 is executed as the requesting device or user is unrecognized. In case where decisional operation 354 evaluates to "true," an operation 356 is executed. Operation 356, when executed, retrieves an environment from, for example, the context server 109 and data store associated therewith (not pictured). Operation 357 is executed to transmit the environment 207. Operation 358 is executed to receive the environment 207. In some example embodiments, the operation 358 is executed by one of more of the interfaces shown in FIG. 3A. A decisional operation 359 is executed to determine whether an update of the environment 207 is required. In cases where decisional operation 359 evaluates to "false," a termination condition 360 is executed. In cases where decisional operation 359 evaluates to "true," an operation 361 is executed. Operation 361 is executed to update the environment 207. This update may include additional location information relating to the cell phone 101, or other device participating in the context 122. Operation 362 is executed to transmit an environment update 370. This environment update 370 is received through the execution of operation 363. Operation 364 is executed to store the environment update 370 into a data store 365.

Metadata, Session and Asset

Metadata generally includes tags and metadata content. The metadata content may be automatically generated by logic in a device. The logic may be implemented using software, hardware or a combination of both. Alternatively or in addition, the metadata content may be generated by a user using an interface associated with the device. For example, the interface may include a menu displaying options that enable the user to enter the metadata content. The tags may be used to encapsulate the metadata content. There may be a beginning tag and an ending tag. Different types of metadata may be associated with different types of tags. When a tag is identified by a device, the metadata content may be extracted from the metadata and used accordingly. For example, when the metadata is to represent contextual information relating to a session, the metadata content is expected to include information about the session. An example of a device is described in FIGS. 1-3.

Figure 4:
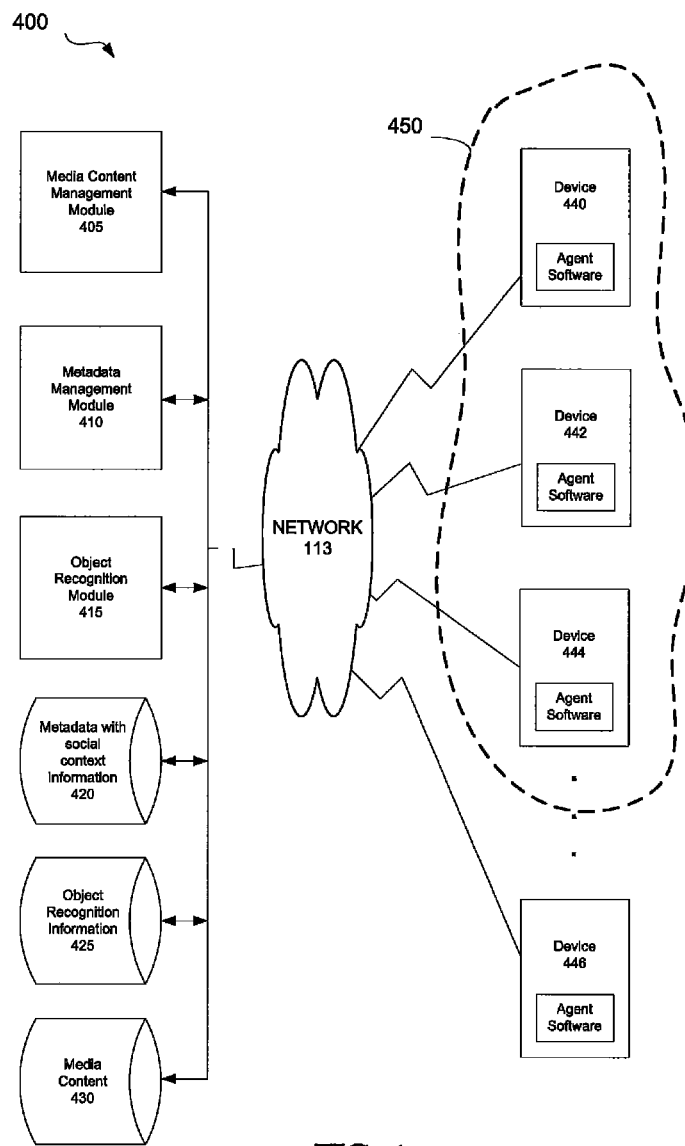
FIG. 4 is a diagram illustrating an example network that supports using metadata to represent contextual information, in accordance with some example embodiments.

FIG. 4 is an example network diagram illustrating a network that supports using metadata to represent contextual information, in accordance with some example embodiments. Diagram 400 is illustrated to include various devices and network application logic or modules communicating using the network 113. The network modules and devices may process, store and make available asset captured or generated by the devices 440-446 in a session. Other assets previous captured by other devices in other sessions may also be available for access. Examples of asset may include images, video, texts, or their combinations. As described above, the devices 440-446 may participate in various sessions based on their users signing into the network and joining sessions. Merely as an example, the devices 440-444 are in the same session 450. The device 446 is not in the same session 450, but it may join by invitation. The session 450 may be managed by session management logic which may be included in the session management server 114 (illustrated in FIGS. 1-2).

During the time that the session 450 is active, the devices 440-444 exchange asset with one another. New asset may be generated. Existing asset may be copied, combined and transmitted to one or more of the devices 440-444. The asset may be stored locally in the devices 440-444. For some example embodiments, the asset or copies of the asset may be transmitted to and stored by the network services. For example, the asset may be stored in the content database 430 and managed by the content management module 405. Each asset may be associated with unique asset ID. The metadata associated with the asset may be automatically generated by the devices 440-444 or specified by the users of the devices 440-444. The metadata may be transmitted to and stored by the network services. For example, they may be stored in the metadata database 420 and managed by the metadata management module 410.

For some example embodiments, object recognition information may be generated and associated with objects included in the asset. For example, the asset may be a video, and the video may include various objects and/or sceneries. The video may be analyzed by the object recognition module 415 to generate object recognition information for the objects and/or the sceneries included in the video. The resulting object recognition information may be stored in the object recognition information database 425. For some embodiments, the object recognition information is stored as metadata content.

Figure 5:
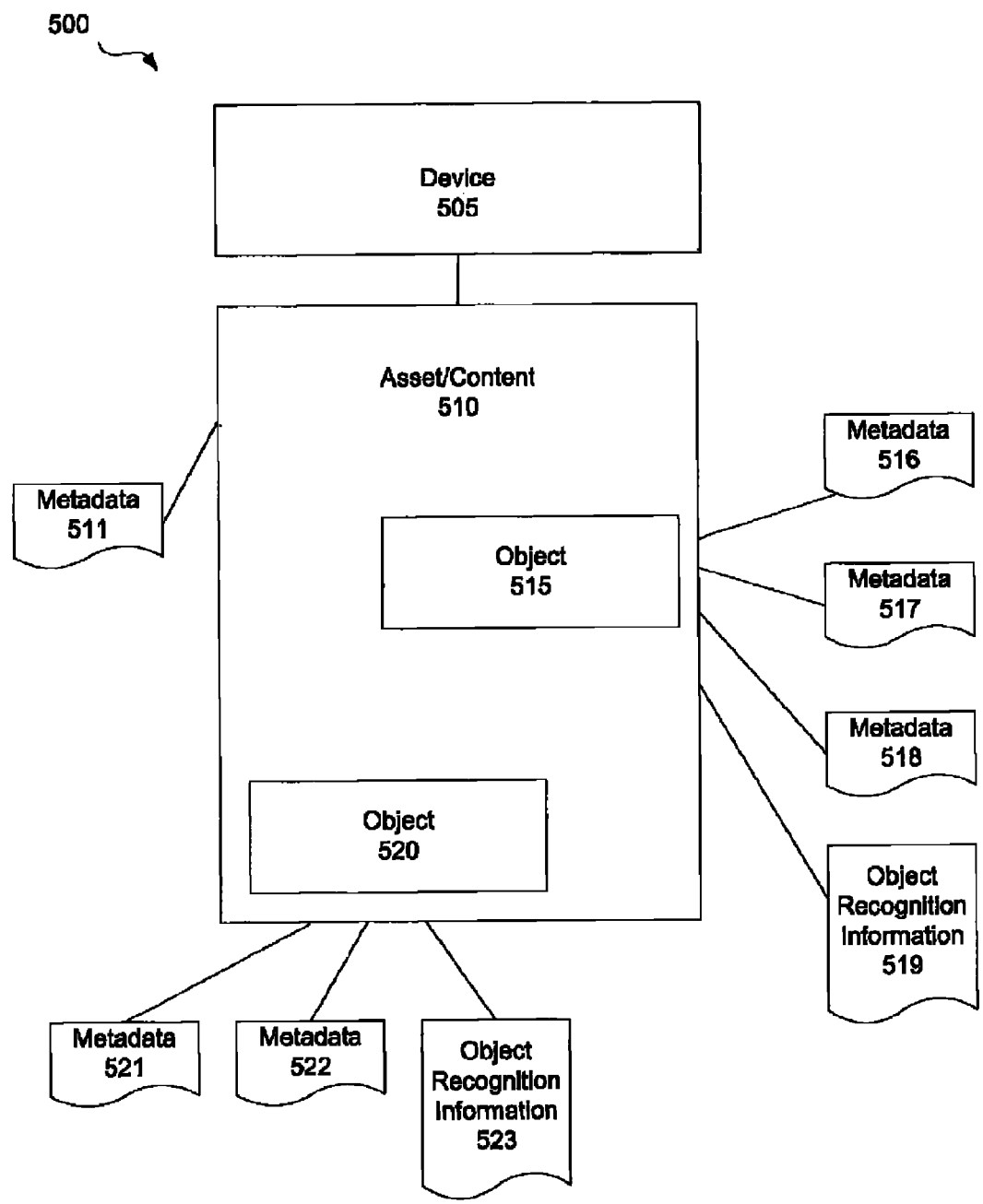
FIG. 5 is a block diagram illustrating information that may be associated with an asset as related to a device, in accordance with some example embodiments.

FIG. 5 is a block diagram illustrating information that may be associated with content as related to a device, in accordance with some example embodiments. Diagram 500 shows a device 505. The device 505 hosts agent software that enables it to establish or join a session managed by the session management server 114 (illustrated in FIG. 1). A user using the device 505 accesses (e.g., cause display of) asset 510. The asset 510 may have been generated by another device, stored in the content database 430, and transmitted to the device 505. The asset 510 may have been generated during a session having a context. The asset 510 may then be stored and accessed in various contexts. Merely as an example, the asset 510 may be an image and may include two objects 515 and 520.

For some example embodiments, the metadata associated with an asset may include contextual information relating to a session and information about objects represented in the asset. In this example, each of the objects 515 and 520 may be associated with object recognition information and metadata. This may be in addition to the metadata 511 for the asset 510. For example, the metadata 516-518 and object recognition information 519 may refer to the object 515, and the metadata 521-522 and object recognition information 523 may refer to the object 520.

Contextual information may include information about settings, interactions, and locations, how they are interpreted, experienced and felt. Different contexts may be related to different discussions, topics, etc. For some example embodiments, the metadata may include information that represents a context as related to a session. As an example, a session may be a social gathering, and the contextual information may include information about conversations or actions of participants in the social gathering. A participant of the social gathering may be associated with metadata that includes information about the topics of the social gathering. As another example, the contextual information may include information about a known location or setting. An object positioned in a known setting may be associated with metadata that includes information about the known setting.

The metadata may be created, stored and shared in various contexts. Each metadata may include dates relating to when an associated session occurs. For example, the object 515 may be a person, and the metadata 516 may be, for example, "attended company meeting on Dec. 2, 2007 and discussed vacation options with Mr. Smith". The content of the metadata 517 may be, for example, "attended a conference on Jan. 15, 2008 and participate in a discussion panel on the topic of global warming with Mr. Brown and Mr. Johnson". By using object recognition, the asset 510 may be enriched with information associated with multiple levels of metadata. The multiple levels of metadata are based on the multiple objects in the content and the different dates and sessions that each of the metadata is associated with. It may be noted that the objection recognition information may be applicable only to objects in the content that may be recognized. There may be situations when the objects in the content may not be recognized using object recognition. For example, the content may include documents, emails, audio clips, text messages based on short message service (SMS), applications, etc.

Figure 6:
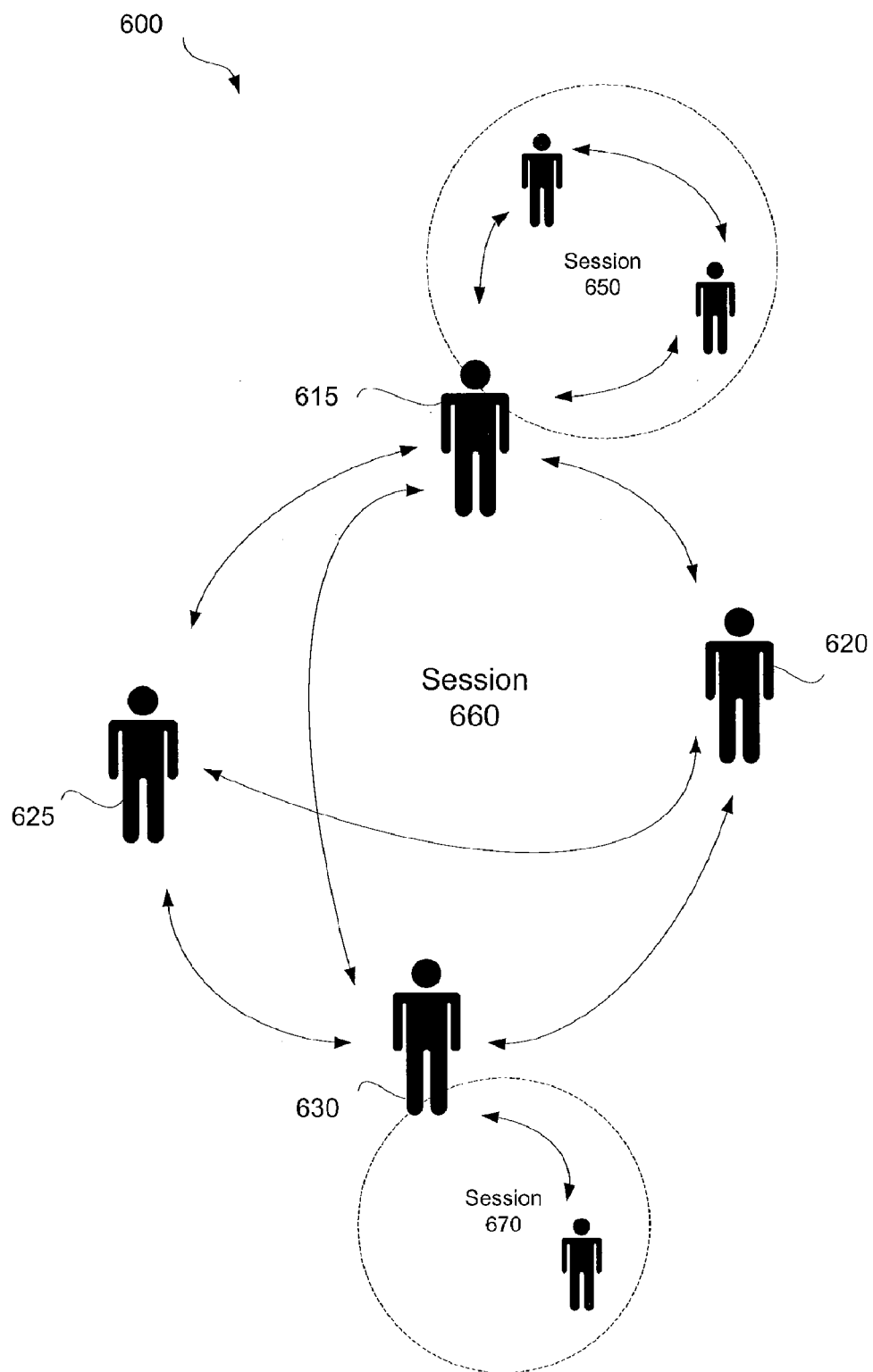
FIG. 6 is a diagram illustrating context information that may be associated with metadata and objects in content of an asset, in accordance with some example embodiments.

FIG. 6 is a diagram illustrating context information that may be represented by the metadata associated with an asset, in accordance with some example embodiments. Diagram 600 includes three sessions 650, 660 and 670. The session 660 is associated with first context. The sessions 650 and 670 (in hyphenated circles) may be associated with a second and third context, respectively. The session 660 includes four participants 615-630, each may be associated with a device connected to the session 660, and each may interact or communicate with one another in various operations (e.g., sharing asset, etc.). The double arrow lines included in the diagram 600 illustrate possible interactions. Each of the sessions 650, 660, and 670 may also be referred to as an interaction session.

Metadata may be generated to represent information about one or more of the interactions (also referred to as interaction information). For example, the metadata may represent the topic of the interaction and the participants in the interaction. The metadata may then be associated with each of the participants of an interaction. The participant 615 and the participant 630 may be associated with metadata that represents a context of the session 650 and 670, respectively. In the current example, the metadata associated with the sessions 650, 660 and 670 may be associated with different dates. It may be noted that, while analyzing an asset associated with the session 660, object recognition information may be used to recognize the participant 630. The object recognition may be applied to other participants of other sessions.

Figure 7:
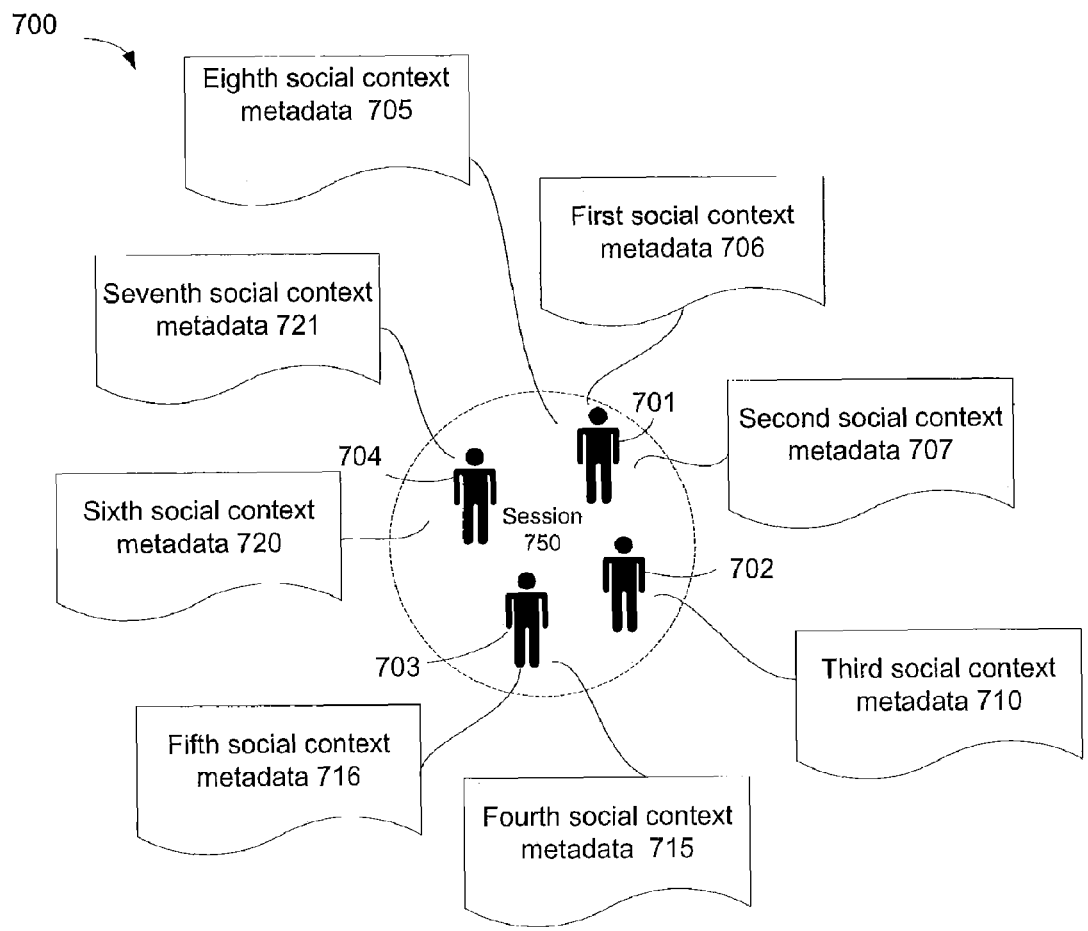
FIG. 7 is a diagram illustrating another example of having multiple metadata generated from one interacting session, in accordance with some example embodiments.

FIG. 7 is a diagram illustrating another example of having multiple metadata associated with one session, in accordance with some example embodiments. Diagram 700 includes four participants 701-704 in a session 750 and multiple metadata 705-721. Each of the participants 701-704 may have different interactions with one or more of the other participants via their respective devices (not shown). Metadata may be generated for the session 750. Metadata may also be generated each of these interactions between the participants 701-704. Depending on a number of interactions that a participant has with the other participants, the number of metadata may vary. For example, the participant 701 is associated with three metadata 705-707, and the participant 702 is associated with one metadata 710.

Figure 8:
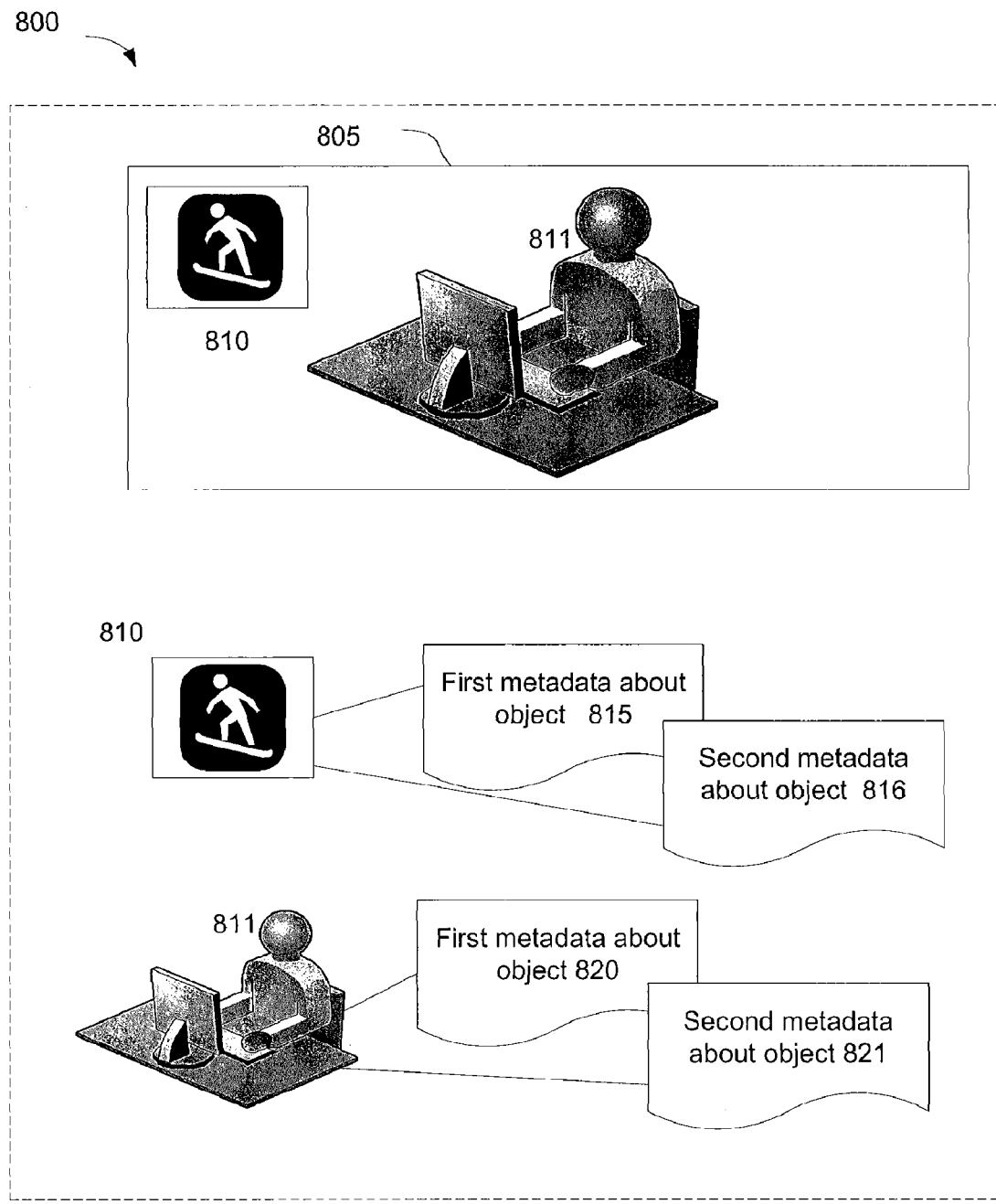
FIGS. 8-9 are diagrams illustrating examples of presenting asset and associated metadata using a device, in accordance with some example embodiments.
Figure 9:
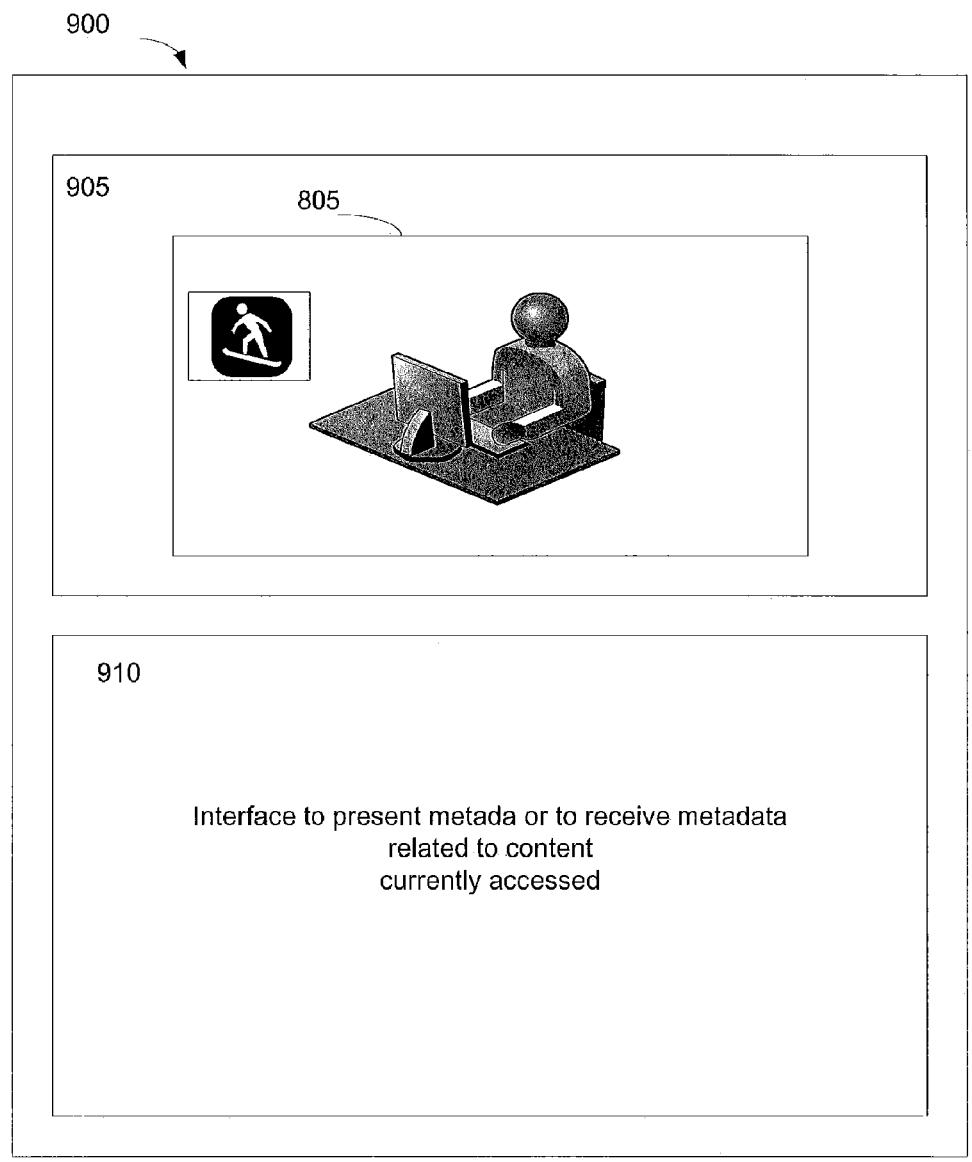

FIG. 8 is a diagram illustrating an example asset and associated metadata, in accordance with some example embodiments. Diagram 800 includes asset 805 which includes objects 810 and 811. The asset 805 may be presented on a device configured as described in FIG. 3A. The device may be participating in a session, and the asset 805 may be associated with metadata that represents context information of that session. The asset 805 may be an image (e.g., a photograph) or a frame of a video. The object 810 may be a picture hanging on a wall behind the object 811. Using object recognition, the object 810 may be analyzed and determined to be associated with a type of sport activity (e.g., skiing) associated with a particular event (e.g., 2006 Winter Olympics). Existing metadata relating to this sport and/or this event may then be associated with the object 810. This is illustrated as metadata 815 and 816. Similarly, using object image recognition, the object 811 may be analyzed and existing metadata may be associated with the object 811, illustrated as metadata 820 and 821. The metadata associated with the objects 810 and 811 may be presented in a device when the asset 805 is presented. This is illustrated as an example in FIG. 9 with a device 900 where the asset 805 is presented in the display area 905. The device 900 may also have a second display area 910 where the metadata is presented. The second display area 910 may include a user interface to enable updating and/or generating new metadata. As the metadata is generated, time and date information may also be recorded. For some example embodiments, the metadata may be used to create a historical timelines to present information related to sessions that occurred over a period of time.

Flow Diagram

Figure 10:
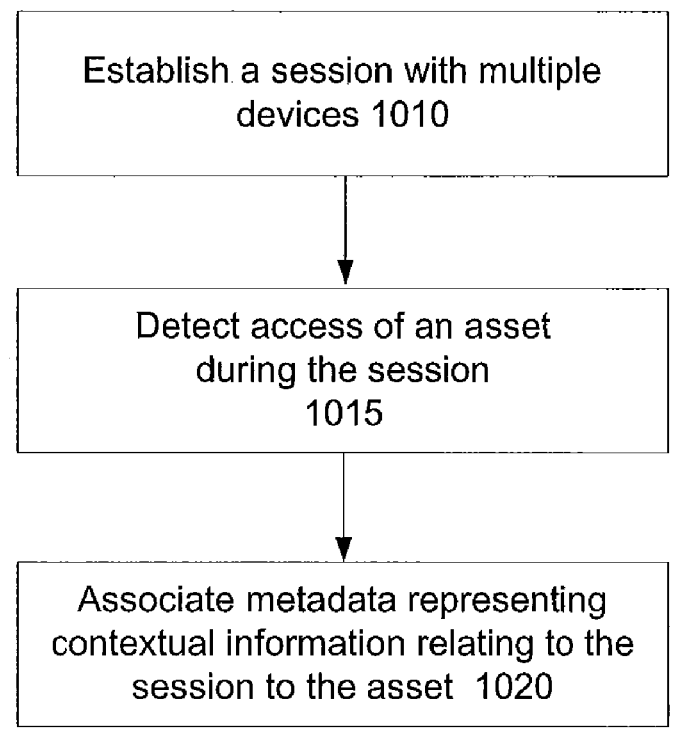
FIG. 10 is an example flow diagram illustrating a method that may be used to associate metadata with an asset, in accordance with some example embodiments.

FIG. 10 is an example flow diagram illustrating a method that may be used to associate metadata with an asset, in accordance with some example embodiments. The method may be performed by a server computer system and may start at block 1010, where a session is established. The session may be participated by multiple users and their respective devices. The session may be associated with a context. At block 1015, it is detected that an asset is accessed during the session by one or more devices. The asset may be generated by one of the devices during the session. The asset could have been previously generated and stored in a device or in content database 115 and managed by the content server 116 (illustrated in FIG. 1). At block 1020, the asset is associated with the metadata relating to the session. The metadata may represent information that relates to location, settings, interactions, etc. The metadata may further represent the participants, devices that participate in the session, and/or content of the asset. The content of the asset may include persons or any identifiable objects. An example is illustrated in FIG. 8.

Figure 11:
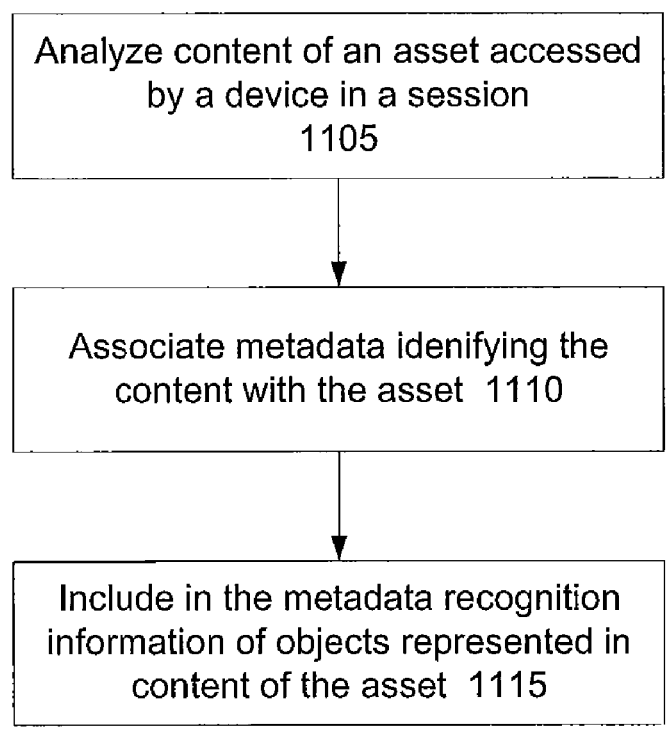
FIG. 11 is an example flow diagram illustrating another method that may be used to associate metadata with an asset, in accordance with some example embodiments.

FIG. 11 is an example flow diagram illustrating another method that may be used to associate metadata with an asset, in accordance with some example embodiments. The method may be performed by a server computer system and may start at block 1105 where an asset is accessed by a device participating in a session. Content of the asset may be analyzed and identified. Metadata representing the content of the asset may be generated. The metadata may then be associated with the asset, as shown in block 1110. The content of the asset may include objects. These objects may be identified and recognition information may be generated at least for some of the objects. At block 1115, the recognition information may be included in the metadata that represent the content of the asset. Alternatively, the recognition information may be associated with the content of the asset and with the metadata but may be stored separately from the metadata.

Figure 12:
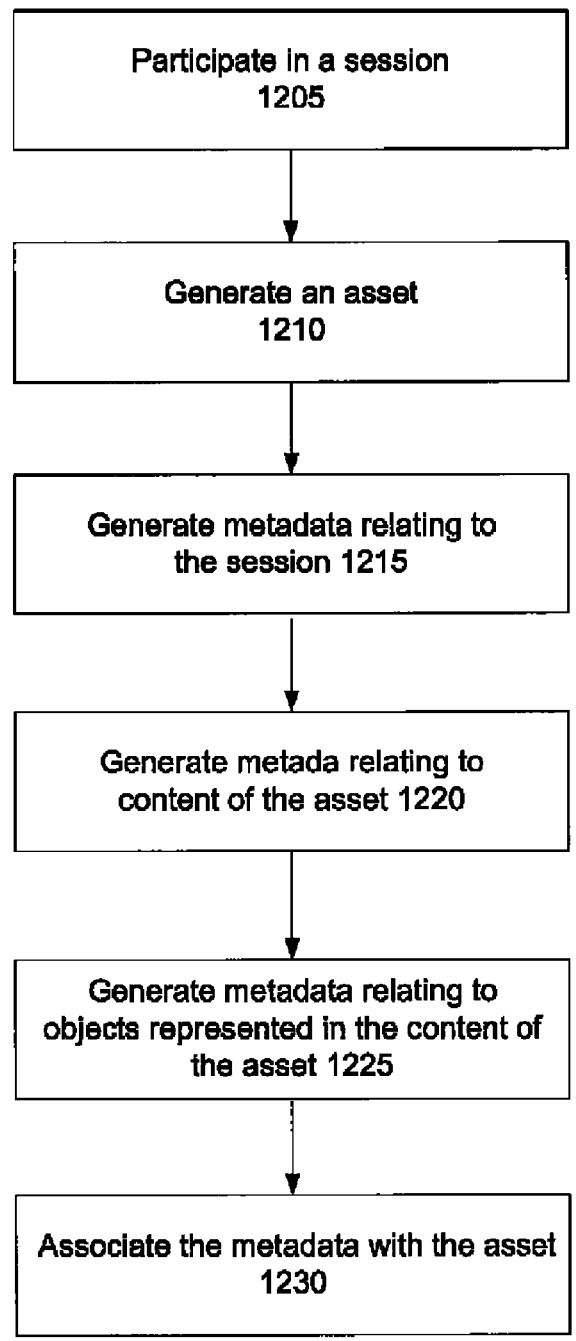
FIG. 12 is an example flow diagram illustrating a method that may be used to generate and associate metadata with an asset, in accordance with some example embodiments.

FIG. 12 is an example flow diagram illustrating a method that may be used to generate and associate metadata with an asset, in accordance with some example embodiments. The method may be performed by a device and may start at block 1205 where the device joins and participates in a session. The device may be used to generate or capture an asset (e.g., an image), as shown in block 1210. The device may include a display to display a user interface. A user of the device may use the interface to provide contextual information about the session. The contextual information may be stored as metadata, as shown in block 1215. The asset captured or generated by the device has content and information about the content may be generated and stored as metadata, as shown in block 1220. The content of the asset may include persons and/or objects. Information about the objects may be generated and stored as metadata, as shown in block 1225. At block 1230, the metadata that represents the session, the content of the asset, the objects included in the content of the asset may be associated with the asset. For some example embodiments, the generation of the metadata and the association of the metadata may be performed by the network services.

Figure 13:
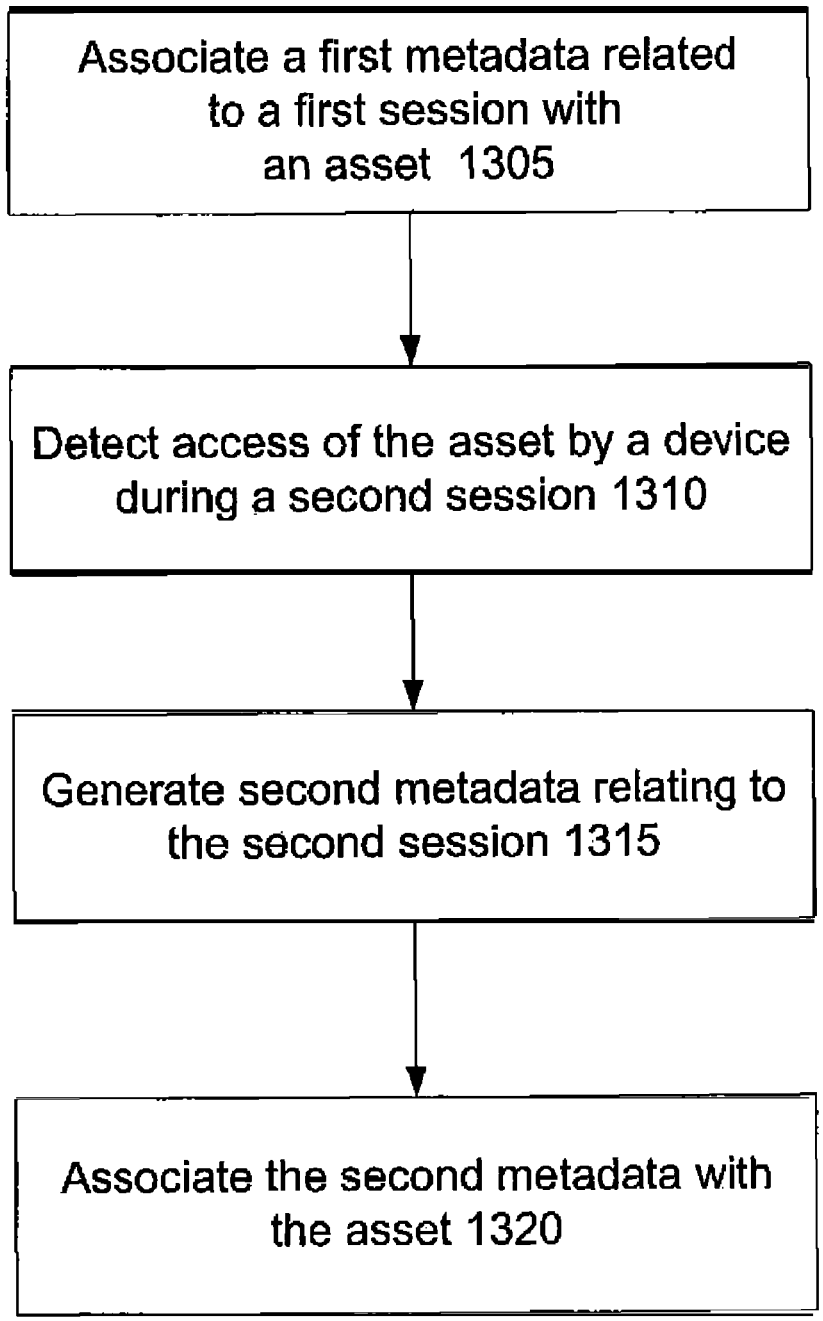
FIG. 13 is an example flow diagram illustrating a method that may be used to associate metadata related to multiple sessions with an asset, in accordance with some example embodiments.

FIG. 13 is an example flow diagram illustrating a method that may be used to associate metadata related to multiple sessions with an asset, in accordance with some example embodiments. The method may be performed by a server computer system and may start at block 1305 where a first metadata related to a first session is associated with an asset. The asset may be stored in a database managed by a server computer system. At block 1310, it is detected that the asset is accessed by a device in a second session. The second session may be related to a different context from a context of the first session. The second context may occur at a different time and the device accessing the asset may be at a different location from a location where the asset was first generated. At block 1315, metadata may be generated to include contextual information related to the second session. At block 1320, the second metadata is associated with the asset. This is in addition to the first metadata previously associated with the asset.

Modules, Components and Logic

Certain embodiments are described herein as including logic or a number of components, modules, or mechanisms. A component may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "component" that operates to perform certain operations as described herein.

In various embodiments, a "component" may be implemented mechanically or electronically. For example, a component may comprise dedicated circuitry or logic that is permanently configured (e.g., within a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, a one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

The term "module", as used herein, should be understood to refer more broadly to a tangible component or a software component, or any combination thereof. Accordingly, a module may be implemented in electronic circuitry, hardware, firmware, software or a combination thereof.

Electronic, Apparatus and System

Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 14:
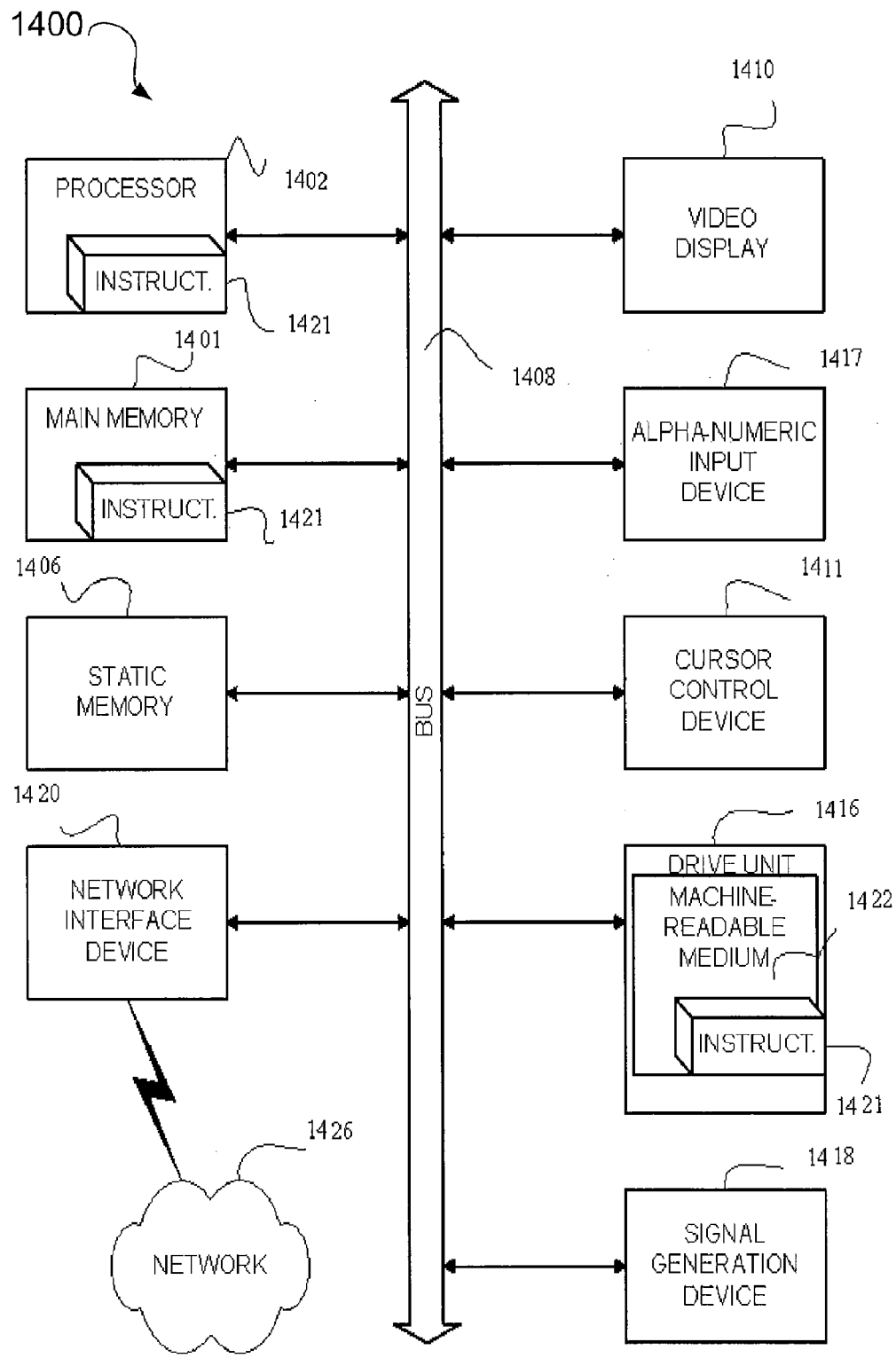
FIG. 14 is a block diagram of machine in the example form of a computer system within which instructions, for causing the machine to perform any one or more of the methodologies discussed herein, may be executed, in accordance with some example embodiments.

FIG. 14 is a block diagram of machine in the example form of a computer system within which instructions, for causing the machine to perform any one or more of the methodologies discussed herein, may be executed, in accordance with some example embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1401 and a static memory 1406, which communicate with each other via a bus 1408. The computer system 1400 may further include a video display unit 1410 (e.g., liquid crystal display (LCD) or a cathode ray tube (CRT)). The computer system 1400 also includes an alphanumeric input device 1417 (e.g., a keyboard), a user interface (UI) navigation device 1411 (e.g., a mouse), a disk drive unit 1416, a signal generation device 1418 (e.g., a speaker) and a network interface device 1420.

Machine-Readable Medium

The disk drive unit 1416 includes a machine-readable medium 1422 on which is stored one or more sets of instructions and data structures (e.g., software 1421) embodying or utilized by any one or more of the methodologies or functions described herein. The software 1421 may also reside, completely or at least partially, within the main memory 1401 and/or within the processor 1402 during execution thereof by the computer system 1400, the main memory 1401 and the processor 1402 also constituting machine-readable media.

While the machine-readable medium 1422 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 1421 may further be transmitted or received over a communications network 1426 using a transmission medium via the network interface device 1420 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks) The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments illustrated. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A processor-implemented method comprising:
    establishing a first interaction session having a first context, wherein the first context occurs at a first time and includes information about a first device and a second device, interactions among the first and second devices, and participants associated with the first and second devices;
    detecting access of an asset during the first interaction session;
    associating first session metadata with the asset, wherein the first session metadata includes contextual information for the first interaction session identifying both (a) participants associated with the first and second devices in the first interaction session and (b) a location of the first device during the first interaction session;
    establishing a second interaction session having a second context, wherein the second context includes information about a third and a fourth device, interactions among the third and fourth devices, and participants associated with the third and fourth devices;
    detecting access of said asset during the second interaction session by the third device, wherein the second context occurs at a second time different from the first time and the third device is located at a location different from a location where the asset was first generated; and
    associating second session metadata with the asset, wherein the second session metadata includes contextual information for the second interaction session identifying both (a) participants associated with the third and fourth devices in the second interaction session and (b) a location of the third device during the second interaction session.

2. The processor-implemented method of claim 1, wherein the asset is generated during the interaction session.

3. The processor-implemented method of claim 1, wherein the contextual information includes information pertaining to the access of the asset during the interaction session.

4. The processor-implemented method of claim 1, wherein the contextual information includes additional location information identifying a location of the first device.

5. The processor-implemented method of claim 1, wherein the contextual information includes interaction information pertaining to a plurality of interactions, during the interaction session.

6. The processor-implemented method of claim 5, wherein the interaction information identifies a first participant with the interaction session.

7. The processor-implemented method of claim 1, further comprising: associating content metadata with the asset, the content metadata identifying content of the asset.

8. The processor-implemented method of claim 7, further comprising: generating the content metadata to include object recognition information represented in the asset.

9. The processor-implemented method of claim 1, wherein the establishing the interaction session, the detecting access of the asset, and the associating the session metadata are performed by a server.

10. The method of claim 1, wherein the asset is a video, the method further comprising:
    analyzing the video with an object recognition module to identify object recognition information identifying one or more objects in the video; and
    associating session metadata, including the object recognition information identifying the one or more objects in the video, with the video.

11. The method of claim 1, wherein the asset is a photograph, the method further comprising:
    analyzing the photograph with an object recognition module to identify object recognition information identifying one or more objects in the photograph; and
    associating session metadata, including the object recognition information identifying the one or more objects in the photograph, with the photograph.

12. A computer-implemented method comprising:
    executing instructions on a network-based computing platform to, responsive to receiving a first request from a first device, establish a first session having a first context, wherein the first context occurs at a first time and includes information about the first device and a first set of one or more other devices, interactions among the first device and the first set of one or more other devices, and participants associated with the first device and the first set of one or more other devices;
    executing instructions on the network-based computing platform to generate first metadata relating to the first context of the first session, the first metadata including information identifying participants in the first session and location information identifying locations of the first device and the first set of one or more other devices;
    executing instructions on the network-based computing platform to detect the first device accessing an asset during the first session; and
    executing instructions on the network-based computing platform to associate the first metadata with the asset,
    executing instructions on a network-based computing platform to, responsive to receiving a second request from a second device, establish a second session having a second context, wherein the second context occurs at a second time different from the first time and includes information about a second device and a second set of one or more other devices, interactions among the second device and a second set of one or more other devices, and participants associated with the second device and a second set of one or more other devices;

executing instructions on the network-based computing platform to generate second metadata relating to the second context of the second session, the second metadata including information identifying participants in the second session and location information identifying locations of the second device and the second set of one or more other devices, wherein the second device is located at a location different from a location where the asset was first generated;

executing instructions on the network-based computing platform to detect the second device accessing the asset during the second session; and executing instructions on the network-based computing platform to associate the second metadata with the asset.

13. The computer-implemented method of claim 12, further comprising:

executing instructions on the network-based computing platform to include in the metadata recognition information of at least one participant in the session.

14. The computer-implemented method of claim 12, wherein the network-based computing system is included in a cloud computing environment.

15. A system comprising:

a session management module to manage sessions in a network, the session management module to receive a request from a first device to join a first session having a first context, wherein the first context occurs at a first time and includes information about the first device and a first plurality of devices, interactions among the first device and the first plurality of devices, and participants associated with the first device and the first plurality of devices and to receive a request from a second device to join a second session having a second context, wherein the second context occurs at a second time different from the first time and includes information about the second device and a second plurality of devices, interactions among the second device and the second plurality of devices, and participants associated with the second device and the second plurality of devices, wherein the second device is located at a location different from a location where the asset was first generated;

a content management module coupled to the session management module to manage assets including an asset accessible to the first device and the second device; and a metadata management module to manage session metadata associated with the assets, wherein the metadata management module is configured to associate first session metadata with the asset accessible to the first device, the first session metadata representing contextual information of the first session identifying each of (a) one or more participants in the first session and (b) location information identifying locations of the first device and one or more devices of the first plurality of devices and to associate second session metadata with the asset accessible to the second device, the second session metadata representing contextual information of the second session identifying each of (a) one or more participants in the second session and (b) location information identifying locations of the second device and one or more of the second plurality of devices;

wherein at least one of the session management module, content management module, and metadata management module is implemented with a processor, or special purpose logic circuitry;

and wherein the metadata management module is further configured to associate the session metadata with each participant of the first and second sessions.

16. The system of claim 15, wherein the asset accessed by the first device was generated by the first device during the session.

17. The system of claim 16, wherein the metadata associated with the asset accessed by the first device includes at least one of information relating to content of the asset and information relating to an object included in the content of the asset.

18. The system of claim 17, wherein the contextual information relating to the session comprises at least one of interaction information relating to the first device or location information of the first device.

19. The system of claim 15, further comprising a communication interface to receive and transmit information to the first device in the session using a wireless communication channel.

* * * * *